United States Patent [19]

Schertz

[11] 3,902,081

[45] Aug. 26, 1975

[54] PHASE SPLITTER CIRCUIT

[75] Inventor: Burtron D. Schertz, Kokomo, Ind.

[73] Assignee: General Motors Corporation, Detroit, Mich.

[22] Filed: July 11, 1974

[21] Appl. No.: 487,774

[52] U.S. Cl. .................................. 307/262; 328/55

[51] Int. Cl.² .......................................... H03H 7/18

[58] Field of Search ...................... 307/262; 328/55

[56] References Cited

OTHER PUBLICATIONS

Phase Splitter, K. Helwig et al., IBM Tech. Disc. Bull., Vol. 12, No. 11, Apr. 1970.

*Primary Examiner*—John Kominski
*Attorney, Agent, or Firm*—T. G. Jagodzinski

[57] ABSTRACT

A pair of output signals of equal magnitude and opposite phase are developed in response to the application of a single input signal. The output signals ride upon an output bias voltage which may be made to equal approximately one-half of an applied supply voltage.

2 Claims, 1 Drawing Figure

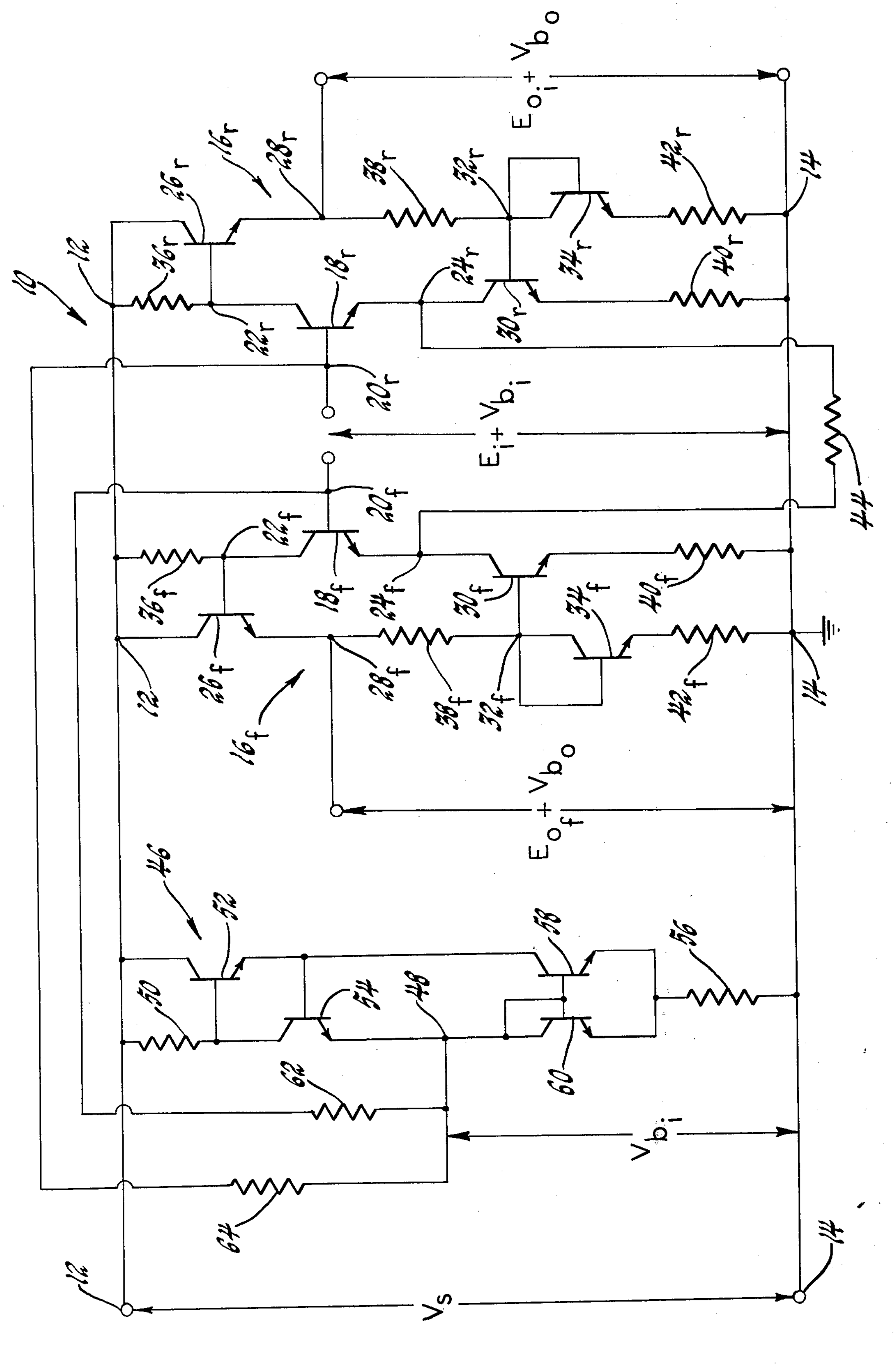

PHASE SPLITTER CIRCUIT

This invention relates to a phase splitter circuit which is responsive to the application of an input signal to develop a pair of output signals of equal magnitude and opposite phase.

Ordinarily, the output signals of a phase splitter circuit are applied to drive a class B push-pull amplifier circuit or the like. In order to maximize the linear voltage swing of the driven circuit, it is desirable that the output signals of the phase splitter circuit ride upon an output bias voltage which is approximately equal to one-half of the applied supply voltage. The present invention provides a simple phase splitter circuit which is capable of achieving this desired result and which is suitable for fabrication as an integrated circuit or as a descrete circuit.

According to the invention, a phase splitter circuit includes identical left and right phase splitter networks as follows: A first transistor includes a base electrode connected to an input node, an emitter electrode connected to a feedback node, and a collector electrode connected to a load node. A second transistor includes a base electrode connected to the load node, an emitter electrode connected to an output node, and a collector electrode connected to a supply node. a third transistor includes a base electrode connected to a bias node, a collector electrode connected to the feedback node, and an emitter electrode. A first resistor is connected between the supply node and the load node. A second resistor is connected between the output node and the bias node. A third resistor is connected between the emitter electrode of the third transistor and a reference node. The series combination of a diode and a fourth resistor is connected between the bias node and the reference node. A fifth resistor is connected between the feedback nodes of the left and right networks.

As a result, in response to the application of an input signal $E_i$ between one of the left and right input nodes and the reference node when a suitable input bias voltage $V_{b_i}$ is applied between each of the input nodes and the reference node, left and right output signals $E_{o_f}$ and $E_{o_r}$ are developed between corresponding ones of the left and right output nodes and the reference node such that the left and right output signals $E_{o_f}$ and $E_{o_r}$ ride upon an output bias voltage $V_{b_0}$ which is approximately defined by the following equation:

$$V_{b_0} = \frac{V_s - V_{j_2} + \left[\frac{R_1}{R_3}\right] V_{j_3} - \left[\frac{R_2}{R_3}\right]\left[\frac{R_1}{R_2 + R_4}\right] V_{j_4}}{1 + \left[\frac{R_1}{R_2 + R_4}\right]\left[\frac{R_4}{R_3}\right]}$$

and such that the gain $E_{of}/E_i$ and $E_{or}/E_i$ of the phase splitter circuit is approximately defined by the following equation:

$$\frac{E_{of}}{E_i} = -\frac{E_{or}}{E_i} = \frac{R_1}{2R_5}$$

where $V_s$ is a supply voltage applied between the supply node and the reference node; $V_{j_2}$ and $V_{j_3}$ are the characteristic base-emitter junction voltage drops of the second and third transistors, respectively; $V_{j_4}$ is the characteristic anode-cathode junction voltage drop of the diode; and $R_1$, $R_2$, $R_3$, $R_4$ and $R_5$ are the resistance values of the first, second, third, fourth and fifth resistors, respectively.

Provided that the following criteria are satisfied:

$V_{j_2} = V_{j_3} = V_{j_4}$ $R_1 = R_2 + R_4$ $R_3 = R_4$ the output bias voltage $V_{b_0}$ is approximately defined by the following simplified equation:

$V_{b_0} = V_s/2$ which indicates that the output bias voltage $v_{b_0}$ is equal to one-half of the supply voltage $V_s$. Each of the above three criteria may be readily met whether the phase splitter circuit is fabricated as an integrated circuit or as a descrete circuit.

These and other aspects and advantages of the invention may be best understood by reference to the following detailed description of a preferred embodiment when taken in conjunction with the accompanying drawing.

In the drawing, the sole FIGURE is a schematic diagram of a phase splitter circuit incorporating the principles of the invention.

Referring to the drawing, a phase splitter circuit 10 includes a supply node 12 and a grounded reference node 14 across which a supply voltage $V_s$ is applied. The phase splitter circuit 10 includes identical left and right phase splitter networks $\mathbf{16}_f$ and $\mathbf{16}_r$.

In the left phase splitter network $\mathbf{16}_f$, a first transistor $\mathbf{18}_f$ includes a base electrode connected directly to an input node $\mathbf{20}_f$, a collector electrode connected directly to a load node $\mathbf{22}_f$, and an emitter electrode connected directly to a feedback node $\mathbf{24}_f$. A second transistor $\mathbf{26}_f$ includes a base electrode connected directly to the load node $\mathbf{22}_f$, a collector electrode connected directly to the supply node 12, and an emitter electrode connected directly to an output node $\mathbf{28}_f$. A third transistor $\mathbf{30}_f$ includes a base electrode connected directly to a bias node $\mathbf{32}_f$ and a collector electrode connected directly to the feedback node $\mathbf{24}_f$. The transistor $\mathbf{30}_f$ also includes an emitter electrode. A fourth transistor $\mathbf{34}_f$ includes a base electrode and a collector electrode both connected directly to the bias node $\mathbf{32}_f$. The transistor $\mathbf{34}_f$ also includes an emitter electrode.

Further, in the left phase splitter network $\mathbf{16}_f$, a first resistor $\mathbf{36}_f$ is connected between the supply node 12 and the load node $\mathbf{22}_f$. A second resistor $\mathbf{38}_f$ is connected between the output node $\mathbf{28}_f$ and the bias node $\mathbf{32}_f$. A third resistor $\mathbf{40}_f$ is connected between the emitter electrode of the third transistor $\mathbf{30}_f$ and the reference node 14. A fourth resistor $\mathbf{42}_f$ is connected between the emitter electrode of the fourth transistor $\mathbf{34}_f$ and the reference node 14.

Since the right phase splitter network $\mathbf{16}_r$ is identical to the left phase splitter network $\mathbf{16}_f$, like numerals are used to denote like elements except that the numberals designating elements in the right phase splitter network $\mathbf{16}_r$ have subscripts *r* while the numerals designating elements in the left phase splitter network $\mathbf{16}_f$ have subscripts *f*. In addition, a fifth resistor 44 is connected between the feedback node $\mathbf{24}_f$ in the left network $\mathbf{16}_f$ and the feedback node $\mathbf{24}_r$ in the right network $\mathbf{16}_r$.

It will be noted that the left and right fourth transistors $\mathbf{34}_f$ and $\mathbf{34}_r$ are actually connected to function as diodes. In effect, the diode-connected transistors $\mathbf{34}_f$ and $\mathbf{34}_r$ have an anode electrode connected directly to a corresponding one of the left and right bias nodes $\mathbf{32}_f$ and $\mathbf{32}_r$ and a cathode electrode connected to a corresponding one of the left and right fourth resistors $42_l$ and $42_r$. Thus, where the illustrated phase splitter circuit 10 is to be fabricated as a descrete circuit, the devices $34_l$ and $34_r$ would be provided by ordinary diodes. However, for reasons which will be more fully explained later, the illustrated phase splitter circuit 10 is preferably fabricated as an integrated circuit. Accordingly, the devices $34_l$ and $34_r$ are depicted in the drawing in the "transistorized form" which has become conventional for the illustration of an integrated circuit diode.

A voltage divider network 46 is provided for applying a suitable input bias voltage $V_{b_i}$ to the phase splitter circuit 10. The voltage divider network 46 comprises a first leg connected between the supply node 12 and a voltage divider node 48 and a second leg connected between the voltage divider node 48 and the reference node 14. The first voltage divider leg includes resistor 50, the base-emitter junction of transistor 52, and the base-emitter junction of transistor 54. The second voltage divider leg includes resistor 46 and the parallel connection of the base-emitter junction of transistor 58 and the base-emitter junction of the diode-connected transistor 60.

Preferably, the resistance of the resistor 50 is approximately twice the resistance of the resistor 56 so that the input bias voltage $V_{b_i}$ defined between the voltage divider node 48 and the reference node 14 is about one-third of the supply voltage $V_s$ applied between the supply node 12 and the reference node 14. A pair of resistors 62 and 64 apply the input bias voltage $V_{b_i}$ from the voltage divider node 48 to the left and right input nodes $20_l$ and $20_r$ of the phase splitter circuit 10, respectively. It is to be understood that the precise form of the voltage divider network 46 is not of critical importance. Accordingly, the illustrated voltage divider network 46 may be replaced by virtually any network capable of generating the desired input bias voltage $V_{b_i}$.

Assuming that an input signal $E_i$ having an increasing amplitude is applied between the left input node $20_l$ and the reference node 14 on top of the input bias voltage $V_{b_i}$, the conduction of current through the left first transistor $18_l$ and the left first resistor $36_l$ increases thereby lowering the potential at the left load node $22_l$. As the potential at the load node $22_l$ decreases, the conduction of current through the left second transistor $26_l$ decreases thereby decreasing the amplitude of the left output signal $E_{o_l}$ defined between the left output node $28_l$ and the reference node 14. Thus, the left output signal $E_{o_l}$ is out of phase with the input signal $E_i$.

The decrease in the potential at the left output node $28_l$ is coupled through the left second resistor $38_l$ to lower the potential at the left bias node $32_l$. As the potential at the bias node $32_l$ decreases, the conduction of current through the left diode $34_l$ and the left fourth resistor $42_l$ decreases thereby equally decreasing the conduction of current through the left third transistor $30_l$ and the left third resistor $40_l$. With the conduction of current through the transistor $18_l$ increasing and the conduction of current through the transistor $30_l$ decreasing, the potential at the left feedback node $24_l$ rises to force a feedback current through the resistor 44 thereby raising the potential of the right feedback node $24_r$.

As the potential at the right feedback node $24_r$ increases, the conduction of current through the right first transistor $18_r$ and the right first resistor $36_r$ decreases thereby raising the potential at the right load node $22_r$. As the potential at the load node $22_r$ increases, the conduction of current through the right second transistor $26_r$ increases thereby increasing the amplitude of the right output signal $E_{o_r}$ defined between the right output node $28_r$ and the reference node 14. Hence, the right output signal $E_{o_r}$ is in phase with the input signal $E_i$.

The increase in the potential at the right output node $28_r$ is coupled through the right second reisistor $38_r$ to raise the potential at the right bias node $32_r$. As the potential at the bias node $32_r$ increases, the conduction of current through the right diode $34_r$ and the right fourth resistor $42_r$ increases thereby equally increasing the conduction of current through the right third transistor $30_r$ and the right third resistor $40_r$. With the conduction of current through the transistor $18_r$ decreasing and the conduction of current through the transistor $30_r$ decreasing, the potential at the right feedback node $24_r$ is lowered to further increase the feedback current through the fifth resistor 44.

Through the foregoing analysis, it has been demonstrated that the application of an input signal $E_i$ between the left input node $20_l$ and the reference node 14 results in the production of a left output signal $E_{o_l}$ from between the left output node $28_l$ and the reference node 14 which is out of phase with the input signal $E_i$ and results in the production of a right output signal $E_{o_r}$ from between the right output node $28_r$ and the reference node 14 which is in phase with the input signal $E_i$. By a similar analysis, it may be demonstrated that the application of an input signal $E_i$ between the right input node $20_r$ and the reference node 14 results in the production of a right output signal $E_{o_r}$ from between the right output node $28_r$ and the reference node 14 which is out of phase with the input signal $E_i$ and results in the production of a left output signal $E_{o_l}$ from between the left output node $28_l$ and the reference node 14 which is in phase with the input signal $E_i$.

In either of the above events, it can be additionally demonstrated that the right and left output signals $E_{o_l}$ and $E_{o_r}$ ride upon an output bias voltage $V_{b_o}$ which is approximately defined by the following equation:

$$V_{b_o} = \frac{V_s - V_{j_2} + \left[\frac{R_1}{R_3}\right] V_{j_3} - \left[\frac{R_2}{R_3}\right]\left[\frac{R_1}{R_2+R_4}\right] V_{j_4}}{1 + \left[\frac{R_1}{R_2+R_4}\right]\left[\frac{R_1}{R_3}\right]}$$

and that the gain $E_{o_l}/E_i$ and $E_{o_r}/E_i$ is generally defined by the following equation:

$$\frac{E_{o_l}}{E_i} = -\frac{E_{o_r}}{E_i} = \frac{R_1}{2R_5}$$

where $V_s$ is the supply voltage applied between the supply node 12 and the reference node 14, $V_{j_2}$ is the characteristic base-emitter junction voltage drop of the left and right second transistors $26_l$ and $26_r$, $V_{j_3}$ is the characteristic base-emitter junction voltage drop of the left and right third transistors $30_l$ and $30_r$, $V_{j_4}$ is the characteristic anode-cathode junction voltage drop of the left and right diodes $34_l$ and $34_r$, $R_1$ is the resistance of the left and right first resistors $36_f$ and $36_r$, $R_2$ is the resistance of the left and right second resistors $38_f$ and $38_r$, $R_3$ is the resistance of the left and right third resistors $40_f$ and $40_r$, $R_4$ is the resistance of the left and right fourth resistors $42_f$ and $42_r$, and $R_5$ is the resistance of the fifth resistor 44.

Where the following three criteria are satisfied:

a. $V_{j_2} = V_{j_3} = V_{j_4}$ b. $R_1 = R_2 + R_4$ c. $R_3 = R_4$ equation (1) is simplified to the following equation:

3. $V_{b_0} = V_s/2$ which indicates that the ouput bias voltage $V_{b_0}$ is equal to one-half of the supply voltage $V_s$. As previously pointed out, this is desirable where the left and right output signals $E_{of}$ and $E_{or}$ are to be applied to drive a Class B push-pull amplifier or the like. While each of the criteria (a), (b) and (c) can be met regardless whether the phase splitter circuit 10 is fabricated as an integrated circuit or as a descrete circuit, they are more readily satisfied when the circuit 10 is integrated.

The correctness of equation (3) may be quickly verified by analyzing the phase splitter circuit 10 with respect to bias voltages and currents only. Referring particularly to the left phase splitter network $16_f$, it may be viewed as a voltage divider network having a first leg connected between the supply node 12 and the left output node $28_f$ and having a second leg connected between the left output node $28_f$ and the reference node 14. Equation (3) is correct if the voltage drop across the first voltage divider leg between the supply node 12 and the left output node $28_f$ is equal to the voltage drop across the second voltage divider leg between the left output node $28_f$ and the reference node 14.

The first voltage divider leg includes the first resistor $36_f$ and the base-emitter junction of the second transistor $26_f$. The second voltage divider leg includes a first branch connected between the left output node $28_f$ and the left bias node $32_f$ and a second branch connected between the left bias node $32_f$ and the reference node 14. The first branch includes the second resistor $38_f$ only. The second branch includes parallel paths provided by the base-emitter junction of the third transistor $30_f$ and the third resistor $40_f$ and provided by the anode-cathode junction of the diode $34_f$ and the fourth resistor $42_f$.

Assuming that the criterion (a) is satisfied so that the base-emitter junction voltage drop $V_{j_3}$ of the third transistor $30_f$ equals the anode-cathode junction voltage drop $V_{j_4}$ of the diode $34_f$, the current through the third and fourth resistors $40_f$ and $42_f$ is equal. Moreover, the current through the first resistor $36_f$ is equal to the current through the third resistor $40_f$ while the current through the second resistor $38_f$ is equal to the current through the fourth resistor $42_f$. Consequently, the current through each of the resistors $36_f$, $38_f$, $40_f$, and $42_f$ is identical.

Assuming that the criterion (c) is satisfied, the resistance $R_3$ of the third resistor $40_f$ is equal to the resistance $R_4$ of the fourth resistor $42_f$. Since the current through the third and fourth resistors $40_f$ and $42_f$ is equal, the voltage drop across the third resistor $40_f$ is equal to the voltage drop across the fourth resistor $42_f$. As a result, the third transistor $30_f$ and the third resistor $40_f$ may be disregarded in computing the voltage drop across the second branch of the first voltage divider leg which is equal to the summation of the voltage drop $V_{j_4}$ across the anode-cathode junction of the diode $34_f$ and the voltage drop across the fourth resistor $42_f$.

Assuming that the criterion (b) is satisfied, the resistance $R_1$ of the first resistor $36_f$ is equal to the summation of the resistance $R_2$ of the second resistor $38_f$ and the resistance $R_4$ of the fourth resistor $42_f$. Since the current through the first, second and fourth resistors $36_f$, $38_f$ and $42_f$ is equal, the voltage drop across the first resistor $36_f$ is equal to the summation of the voltage drop across the second resistor $38_f$ and the voltage drop across the fourth resistor $42_f$.

The voltage drop across the first voltage divider leg betweem the supply node 12 and the left output node $28_f$ is equal to the summation of the voltage drop across the first resistor $36_f$ and the base-emitter junction voltage drop $V_{j_2}$ of the second transistor $26_f$. The voltage drop across the second voltage divider leg between the left output node $28_f$ and the reference node 14 is equal to the summation of the voltage drop across the second resistor $38_f$, the anode-cathode junction voltage drop $V_{j_4}$ of the diode $34_f$, and the voltage drop across the fourth resistor $42_f$.

Due to the satisfaction of the criterion (a), the voltage drop $V_{j_2}$ across the base-emitter junction of the second transistor $26_f$ in the first voltage divider leg is equal to the voltage drop $V_{j_4}$ across the anode-cathode junction of the diode $34_f$ in the second voltage divider leg. Further, due to the satisfaction of the criterion (b), the voltage drop across the first resistor $36_f$ is equal to the summation of the voltage drop across the second resistor $38_f$ and the voltage drop across the fourth resistor $42_f$. Accordingly, the voltage drop across the first voltage divider leg between the supply node 12 and the left output node $28_f$ is equal to the voltage drop across the second voltage divider leg between the left output node $28_f$ and the reference 14. Thus, the validity of equation (3) is verified. A similar analysis may be made for the right phase splitter network $16_r$.

It will now be appreciated that the illustrated embodiment of the inventive phase splitter circuit 10 is shown for demonstrative purposes only and that various alterations and modifications may be made to this preferred embodiment without departing from the spirit and scope of the invention.

What is claimed is:

1. A phase splitter circuit for developing left and right output signals $E_{of}$ and $E_{or}$ of equal magnitude and opposite phase between corresponding ones of left and right output nodes and a reference node in response to the application of a single input signal $E_i$ between one of left and right input nodes and the reference node when a supply voltate $V_s$ is applied between a supply node and the reference node and when a suitable input bias voltage $V_{b_i}$ is applied between each of the left and right input nodes and the reference node, comprising: left and right first transistors each having a base electrode connected to a corresponding one of left and right input nodes, each having an emitter electrode connected to a corresponding one of left and right feedback nodes and each having a collector electrode connected to a corresponding one of left and right load nodes; left and right second transistors each having a base electrode connected to a corresponding one of the left and right load nodes, each having an emitter electrode connected to a corresponding one of left and right output nodes, each having a collector electrode connected to a single supply node, and each exhibiting a characteristic base-emitter junction voltage $V_{j2}$; left and right third transistors each having a base electrode connected to a corresponding one of left and right bias nodes, each having a collector electrode connected to a corresponding one of the left and right feedback nodes, each having an emitter electrode, and each exhibiting a characteristic base-emitter junction voltage $V_{j3}$; left and right fourth transistors each having a base electrode connected to a corresponding one of the left and right bias nodes, each having a collector electrode connected to a corresponding one of the left and right bias nodes, each having an emitter electrode, and each exhibiting a characteristic base-emitter junction voltage $V_{j4}$; left and right first resistors each exhibiting a resistance $R_1$ and each connected between a corresponding one of the left and right load nodes and the supply node; left and right second resistors each exhibiting a resistance $R_2$ and each connected between a corresponding one of the left and right output nodes and a corresponding one of the left and right bias nodes; left and right third resistors each exhibiting a resistance $R_3$ and each connected between the emitter electrode of a corresponding one of the left and right third transistors and the reference node; left and right fourth resistors each exhibiting a resistance $R_4$ and each connected between the emitter electrode of a corresponding one of the left and right fourth transistors and the reference node; and a fifth resistor connected between the left and right feedback nodes; whereby the left and righ output signals $E_{of}$ and $E_{or}$ ride upon an output bias voltage $V_{b_0}$ which is equal to one-half of the supply voltage $V_s$ when the following criteria are satisfied:

$V_{j2} = V_{j3} = V_{j4}$ $R_1 = R_2 + R_4$ $R_3 = R_4$.

2. In combination: left and right first transistors each having base and emitter and collector electrodes, the base electrodes each connected to a corresponding one of left and right input nodes, the emitter electrodes each connected to a corresponding one of left and right feedback nodes, and the collector electrodes each connected to a corresponding one of left and right load nodes; left and right second transistors each having base and emitter and collector electrodes and each exhibiting a characteristic base-emitter junction voltage $V_{j2}$, the base electrodes each connected to a corresponding one of the left and right load nodes, the emitter electrodes each connected to a corresponding one of left and right output nodes, and the collector electrodes each connected to a single supply node; left and right third transistors each having base and emitter and collector electrodes and each exhibiting a characteristic base-emitter junction voltage $V_{j3}$, the base electrodes each connected to a corresponding one of left and right diodes and the other of either the corresponding one of the left and right bias nodes or the reference node; and a fifth reisistor connected between the left and right feedback nodes whereby left and right output signals $E_{of}$ and $E_{or}$ of equal amplitude and opposite phase are developed between corresponding ones of the left and right output nodes and the reference node in response to the application of an input signal $E_i$ between one of the left and right input nodes and the reference node when a supply voltage $V_s$ is applied between the supply node and reference node and when a suitable input bias voltage $V_{b_i}$ is applied between the left and right output nodes and the reference node such that the left and right output signals $E_{of}$ and $E_{or}$ ride upon an output bias voltage $V_{b_0}$ defined by the following equation:

$$V_{b_0} = \frac{V_s - V_{j2} + \left[\frac{R_1}{R_3}\right] V_{j3} - \left[\frac{R_2}{R_3}\right]\left[\frac{R_1}{R_2 + R_4}\right] V_{j4}}{1 + \left[\frac{R_1}{R_2 + R_4}\right]\left[\frac{R_4}{R_3}\right]}$$

and such that the voltage gain $E_{of}/E_i$ and $E_{or}/E_i$ is defined by the following equation:

$$\frac{E_{of}}{E_i} = -\frac{E_{or}}{E_i} = \frac{R_1}{2R_5}.$$

* * * * *